United States Patent

Morikawa et al.

[11] Patent Number: 5,811,150
[45] Date of Patent: Sep. 22, 1998

[54] PROCESS FOR PRODUCTION OF SOYBEAN PROTEIN MATERIAL

[75] Inventors: Seiji Morikawa, Sennan-gun; Toshiaki Saito, Sakai; Motohiko Hirotsuka, Kaizuka, all of Japan

[73] Assignee: Fuji Oil Company Limited, Osaka-fu, Japan

[21] Appl. No.: 685,798

[22] Filed: Jul. 24, 1996

Related U.S. Application Data

[63] Continuation of Ser. No. 329,478, Oct. 26, 1994, abandoned.

[30] Foreign Application Priority Data

Oct. 27, 1993 [JP] Japan ................................ 5-268857

[51] Int. Cl.$^6$ ........................................................ A23L 1/20
[52] U.S. Cl. .......................... 426/634; 426/656; 426/524
[58] Field of Search .................... 426/634, 656, 426/524

[56] References Cited

U.S. PATENT DOCUMENTS

| | | | |
|---|---|---|---|
| 3,663,234 | 5/1972 | Ichihata | 99/111 |
| 3,920,853 | 11/1975 | Middendorf et al. | 426/104 |
| 3,922,359 | 11/1975 | Hashizume et al. | 426/574 |
| 4,341,806 | 7/1982 | Gabsby et al. | 426/511 |

FOREIGN PATENT DOCUMENTS

| | | |
|---|---|---|
| 2130282 | 11/1972 | France . |
| 2377771 | 8/1978 | France . |
| 559848 | 3/1944 | United Kingdom . |

OTHER PUBLICATIONS

Patent Abstract of Japan Grp No. C023 vol. No. 4, No. 124 Published Sep. 2, 1980 for Japan Application No. 53-150340.

K. Hashizume, *J.A.R.O.*, "Preparation of a New Protein Food Material by Freezing", vol. 12, No. 2, pp. 104–108 (1978).

*Primary Examiner*—Anthony J. Weier
*Attorney, Agent, or Firm*—Wenderoth, Lind & Ponack

[57] ABSTRACT

A process for producing a soybean protein material involves heating a soybean protein solution in the presence of an alkaline earth metal and then slowly freezing the solution. The soybean protein material formed by the method has a structure in which the layers are oriented along the non-cell ice crystals. The soybean protein material produced by the method has a very smooth mouthfeel in its raw condition but has a mouthfeel similar to that of meat when heated.

7 Claims, 2 Drawing Sheets

5,811,150

PROCESS FOR PRODUCTION OF SOYBEAN PROTEIN MATERIAL

This application is a continuation of now abandoned application, Ser. No. 08/329,478, filed Oct. 26, 1994.

FIELD OF THE INVENTION

The present invention relates to a soybean protein material and a process for production of the same. More particularly, it relates to a soybean protein material having the structure in which the layers are integrally formed oriented or the structure in which the layers are fibrously tearable and a process for production of the same.

BACKGROUND OF THE INVENTION

Various protein materials having the texture have been hitherto known. For example, a protein material obtained by winding and binding "yuba" (dried bean curds) has the structure in which the layers are formed concentrically parallel to the surface. Each layer is composed of a film itself and, therefore, such the protein material has the same mouthfeel as that of "yuba" itself in the raw condition and hardly has the meat-like mouthfeel when heated. In addition, a protein material manufactured by using an extruder has no smoothness and softness like "tofu" (bean curd). The protein material as such has the lamellar (network) and porous structure and hardly has the layered structure.

Next, there is known a method for producing a protein material having the texture by coagulating and freezing a protein. "Kori-tofu" (freeze-dried bean curd) is obtained, typically, by freezing and aging "tofu" which has been prepared harder. However, "kori-tofu" has the sponge-like and porous (cell-like) structure and no layered structure based on freeze-denaturation. In addition, the formation of the fibrous structure of muscle and the layered structure of muscle bundle by freezing the animal fibrous muscle as a raw material is described in JP-B 5-68221. The resulting protein material has the texture based on the fibrous texture.

OBJECTS OF THE INVENTION

The main object of the present invention is to provide a soybean protein material having the good mouthfeel.

Another object of the present invention is to provide a process for production of a soybean protein material having the good mouthfeel.

These objects as well as other objects and advantages of the present invention will become apparent to those skilled in the art from the following description with reference to the accompanying drawings.

SUMMARY OF THE INVENTION

The present inventors studied hard to develop a process for production of a soybean protein material having the good mouthfeel. As the result, we found that a soybean protein material having the good mouthfeel can be obtained by slow freezing of a soybean protein solution containing the particular metal after heat-treatment and that the resulting protein material has the layered structure.

The present invention was done based on the above findings and provides a process for production of a soybean protein material which comprises the step of: slow freezing of a solution of a heat-treated soybean protein in the presence of an alkaline earth metal. There is also provided a soybean protein material which comprises the structure in which the layers have grown oriented along the non-cell ice crystals.

The soybean protein material produced by the process of the present invention has, in the raw condition, the extremely smooth mouthfeel such that it melts in the mouth but, when heated, has the extremely similar mouthfeel to that of meat.

DETAILED DESCRIPTION OF THE INVENTION

Figure 1:
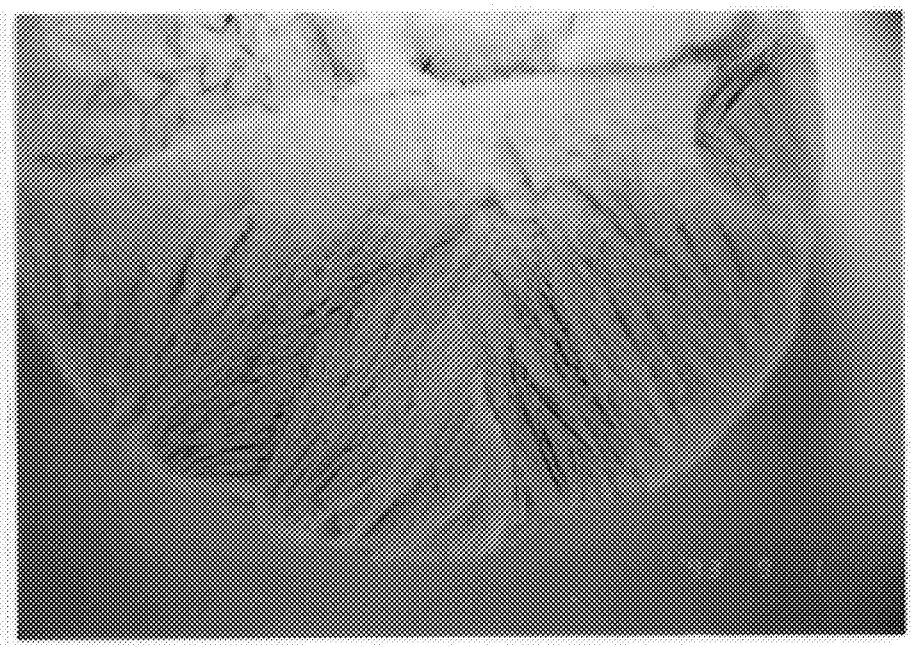
FIG. 1 is a photograph showing the cross section of a lyophilized soybean protein material obtained in Example 1.

First, a process for production of a soybean protein material by slow freezing is explained.

Examples of the soybean protein to be used in the present invention are soybean proteins obtained by extracting soybean, defatted soybean and the like, for example, soybean milk, acid-precipitating protein, concentrated soybean protein, isolated soybean protein and the like.

As used herein, a solution of a soybean protein or a soybean protein solution refers to a soybean protein solution, soybean dispersion or, when high-concentrated, soybean protein paste, in which the precipitates formed from a soybean protein are not present.

The solution of soybean protein in the present invention importantly contains an alkaline earth metal in an amount of 0.01 to 5.0% by weight, preferably 0.2 to 1.0% by weight based on the weight of the crude protein. The strength of the properties of the protein material of the present invention can be regulated with an amount of an alkaline earth metal.

As the amount of an alkaline earth metal grows larger, the strength is increased. As the amount of an alkaline earth metal decreases, the resulting protein material is liable to have the smooth mouthfeel between that of solid and that of liquid. When the amount of an alkaline earth metal is below 0.01% by weight, the layered structure is not formed. On the other hand, when the amount is above 5.0% by weight, the structure of the protein material is far from the layered structure.

The alkaline earth metal may be used as its salt or hydroxide which dissociates into ions in the aqueous system. Examples of the alkaline earth metal are calcium, magnesium and the like. These alkaline earth metals can be used alone or in combination thereof. Calcium is preferably used from a practical or taste point of view.

Any calcium compound may be used as calcium, for example, calcium chloride, calcium hydroxide, calcium sulfate and the like. One or more of these calcium compounds may be used. The calcium compounds may be used together with an alkaline earth metal other than calcium.

The concentration of a soybean protein solution containing an alkaline earth metal is 0.1 to 35% by weight. When the concentration is below 0.1% by weight, the formation of the desired layered structure is difficult even when the soybean protein solution is frozen in the next step. On the other hand, when the concentration is above 35% by weight, the formation of the desired layered structure is difficult because a soybean protein solution is difficult to be held in the flowing state even when it is converted into the slurry.

A soybean protein solution containing an alkaline earth metal is suitably heated at a temperature of not lower than 60° C. for longer than one second, preferably at a temperature of 80° C. to 160° C. for not shorter than 5 seconds, provided that for not longer than 1 minute at a temperature above 100° C. This heat-treatment has not only pasteurizing but also freeze-denaturation enhancing effects.

As described above, it is important that the precipitates formed from a soybean protein solution containing an alkaline earth metal are not present upon freezing. The precipitates are not formed from a soybean protein solution normally at a pH range of 5 to 9, preferably 6 to 8, more preferably 6.5 to 7.5, depending upon the concentration.

At pH around 4.5 which is the isoelectric point of a soybean protein, a soybean protein solution is converted into an insoluble slurry. In this state, a soybean protein material having the desired layered structure can not be obtained, which results in the texture like "kori-tofu". In addition, too high pH is also not preferable since the desired layered structure is hardly obtained and, moreover, the flavor and color tone are deteriorated.

Protein other than soybean protein, starch, lipid, seasoning, coloring agent, flavor agent and the like may be optionally used together in addition to a soybean protein as a main raw material. By the use of these optional components, a material obtained by cooking, freezing and thawing the above soybean protein solution has the smooth mouthfeel and, as such, can be eaten tastily.

By using gluconodeltalactone in the step after a soybean protein solution is heated, a freeze-denatured soybean protein material may be heated to obtain such the effects that the resulting texture becomes firmer due to decrease in pH by degradation of gluconodeltalactone.

A hydrated protein thus prepared is subjected to slow freezing. Slow freezing can afford the structure in which the layers have grown. Upon this, as the rate of slow freezing grows lower, the layers form the planes and, therefore, become difficult to be torn into the fibers. On the other hand, as the rate of slow freezing grows higher, the layers becomes tearable into the fibers and the macroscopical appearances become more fibrous. However, when the rate of slow freezing grows too high (so-called rapid drying), the degree of freeze-denaturation is decreased and thereby texturization becomes difficult.

The rate of slow freezing for changing the structure in which layers have grown into the structure in which the layers are fibrously tearable depends upon the size and shape of the desired soybean protein material. Normally, when the temperature falling rate at the surface of the soybean protein material is lower than 0.4° C. per minute, the layers form the planes and further form the structure which is difficult to be fibrously torn. As the rate grows higher than 0.4° C. per minute, there is a tendency that the structure in which the layers are fibrously tearable is formed or the layers are converted into the macroscopically fibrous material.

In slow freezing, the time for passing through maximum ice crystals forming zone is required to be not shorter than 30 minutes. The layers which are formed at the time for passing through maximum ice crystals forming zone in the central part of a hydrated protein of not shorter than 2 hours are liable to be hardly torn into the fibers. As the time for passing through maximum ice crystals forming zone grows shorter than 2 hours, there is a tendency that the structure in which the layers are fibrously tearable is formed or the layers are converted into the macroscopically fibrous material.

In order to decrease the rate of slow freezing, cooling is suitably carried out with air having the low heat conductivity. Freezing is suitably carried out normally in the atmosphere at −20° C. to −30° C. In order to increase the rate of slow freezing, cooling is suitably carried out by bringing into contact with a liquid brine having the high heat conductivity (normally at −20° C. to −25° C.).

Normally, freezing can be carried out at a temperature of not higher than −2° C. Practically, −2° C. to −60° C. is suitable. In particular, slow freezing can be effectively carried out in the atmosphere at −20° C. to −30° C.

The process where the layered or fibrous structure is formed can be considered as follows:

In the case where the rate of slow freezing is lower, when a hydrated protein is placed in the atmosphere at a temperature of not higher than the freezing point, ice crystals are formed in a linear fashion on the surface and they grow in the heat conducting direction (towards the central part) in the course of time. At the same time, a protein begins to be freeze-denatured and the protein and ice crystals form the layered structure starting from the surface then in the heat conducting direction (towards the central part), that is, from a lower temperature part to a higher temperature part. As the rate of slow freezing grows higher, ice crystals become finer and it is presumed that, as a result, the structure in which the formed protein layers are fibrously tearable is formed or, since the formed ice crystals become shorter from linear to dot-like, the macroscopically fibrous structure is formed.

Therefore, for example, when three sides of a hydrated protein are thermally insulated and remained one side thereof is exposed to the cold air or liquid brine, linear or dot-like ice crystals are first formed at the opened part of the surface and, then, ice crystals grow in a plane-like or linear fashion along the coldness delivery direction. This is accompanied by freeze-denaturation of a soybean protein to give a layered material in which an ice crystals layer and a freeze-denatured protein layer are arranged layered one after the other or a macroscopically fibrous material.

Figure 3:
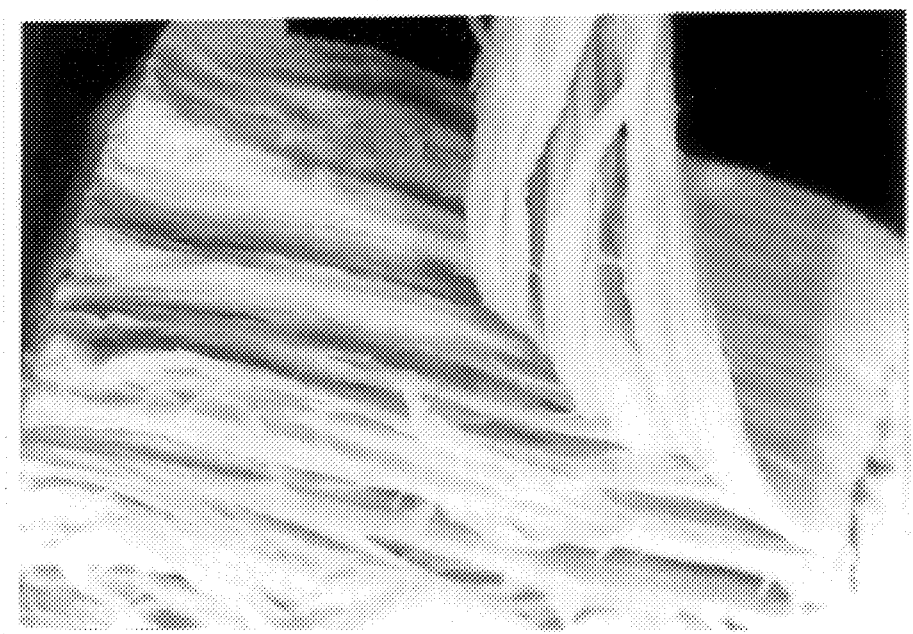
FIG. 3 is a photograph showing the protein material of FIG. 2 which is being torn into the fibers by loosening.

In the other case, for example, when all the peripheral parts of a hydrated protein are exposed to the cold air or liquid brine, the protein layers or fibers are formed inward via ice crystals. That is, as freezing proceeds from the peripheral parts to the central part, linear or dot-like ice crystals are first formed and the formed crystals grow into inward plane-like or linear ones. When a plurality of such the crystals grow competitively in the inner part, the crystals having the lower rate of growing stop growing and the crystals having the higher rate of growing further continue to grow until next competition (FIG. 1). This is why the degree of plane-like or linear growing (the depth of growing tip) becomes different. Alternatively, for example, when only two opposite sides are exposed to the cold air or liquid brine, the linear or dot-like crystals are first formed on both surfaces and the formed both crystals grow inwardly parallel to each other into the plane-like linear plane ones. The adjacent both growing crystals rarely compete and continue to grow in an only one direction. Finally, they form a collision plane to stop growing (FIG. 3). Alternatively, for example, when a part of the peripherals is brought into contact with a brine and the contacted part is randomly changed in the course of time, the direction of growing crystals can be randomly changed three-dimensionally.

A protein is freeze-denatured while compartmented by the plane-like or linear ice crystals, to give the layered structure or the macroscopically fibrous structure. Although the plane-like or linear ice crystals are not formed when the conventional soybean protein solution or the like is frozen, the above ice crystals are formed when a soybean protein solution in the present invention is frozen under the above-mentioned conditions.

Upon freezing, any containers made of a material having the resistance to freezing can be used, for example, a container made of a metal such as stainless steel, aluminium or the like, or soft plastic or the like.

The soybean protein material thus prepared can be thawed or thawed and dehydrated after slow freezing.

The thawed soybean protein material can be eaten as such or used as a food material. Alternatively, the protein material may be dehydrated from a view point of utilization form, distribution, storage and the like.

Dehydration can be carried out by the known method such as centrifugation, press or the like. Normally, pressure dehydration is preferable since the firm texture can be obtained. Upon pressure dehydration, the stress can be applied by press to decrease the content of water contained between the protein layers or in the layers themselves. Pressure application has the effects for binding the protein more tight to afford the firmer texture.

The thawed or thawed and dehydrated soybean protein material can be further heated.

While the thawed soybean protein material or the dehydrated soybean protein material has the soft mouthfeel such that it melts in the mouth before heating, it has the meat-like mouthfeel after heating.

When the thawed soybean protein material is heated as such, it is separated into each unit layer or into each layer comprising a plurality of unit layers or macroscopical fibers are separated, in a solution, to give the flake-like or fibrous material.

Alternatively, as described for the above dehydration, when the protein material is heated while the stress is applied to the material to hold the layers or fibers tight, the layers or fibers adhere together to give a block-like and meat-like protein material having the compact structure.

This block-like and meat-like protein material can by manually peeled or torn into the fibers.

The stress can be applied in any fashion. For example, a method described for the above hydration, a method by filling a protein material in a casing tube or the like and heating at a sufficient temperature to heat set a protein or the like can be used. Heating is sufficiently carried out to a thermal historical extent that the layers or fibers of a soybean protein material adhere together and are set (normally at a temperature of not lower than 80° C.).

The above-described frozen soybean protein material, thawed soybean protein material, dehydrated soybean protein material, heated soybean protein material and the like can be further dried.

Drying can be carried out by the known methods such as microwave drying, frying drying, hot air drying and the like.

As described above, a soybean protein material of the present invention has the structure in which the layers have been one- to three-dimensionally grown and are oriented along the traces of a plurality of non-cell ice crystals, depending upon the extent of the rate of slow freezing.

The oriented structure can be the structure in which the layers have grown or the structure which can be easily loosened into the fibers.

In some cases, the traces of the growing tips of ice crystals form a nodular plane.

First, a soybean protein material having the structure in which the layers have been one to three-dimensionally grown and are oriented along the traces of a plurality of the non-cell ice crystals is explained.

The soybean protein material has the structure in which the layers have grown via the traces of a plurality of non-cell ice crystals, for example, the traces of ice crystals which have grown in a plane-like fashion.

As used herein, the ice crystals which have grown in a plane-like fashion refers to the planes of the ice crystals which were formed first in a linear fashion on the surface of a hydrated soybean protein material by freezing and have grown in a plane-like fashion in the coldness conducting direction.

As used herein, the traces of the ice crystals which have grown in a plane-like fashion includes not only the condition where ice crystals grown in a plane-like fashion are present but also the condition where ice crystals have disappeared by melting, drying or the like.

As used herein, the layers refers to the plane-like layers which were formed by freeze-denaturation of a soybean protein via the above-described traces of the plane-like ice crystals (in other words, while compartmented by the above-described plane-like ice crystals). The direction of the layers therein is seldom constant because of the influence by the freezing conditions and a plurality of unit layers are formed normally at from a slight to large angle and in the different directions from each other.

As used herein, the layered structure refers to the structure formed by the combination of a plurality of the above-described layers. This layered structure is the structure in which unit layers are overlapped arbitrarily and arranged in the different directions at a slight angle from each other.

This is because the linear ice lines which are formed first on the cold air side of a soybean protein material are not unidirectional and these linear ice lines grow in the coldness conducting direction to form the plane-like ice crystals. Therefore, unit layer itself is not necessarily the uniform plane but a plurality of layers are overlapped arbitrarily.

Next, when the rate of slow freezing is increased, the structure in which the layers are torn into the fibers (can be loosened) is formed, or the structure in which the layers are converted into the macroscopically fibrous materials and they are further torn into the fibers is formed.

A soybean protein material having the structure which is fibrously tearable refers to the structure which is macroscopically layered or fibrous but the layers or fibers therein can be torn into the finer fibers.

Ice crystals grow in the coldness conducting direction. However, since the growing rate of ice crystals in a soybean protein solution in the present invention has the dispersion, the tip traces become not linear but burred in a nodular plane fashion.

The extent of burrness of the nodular plane becomes higher or lower depending upon the freezing conditions, the form of the container and the like.

The soybean protein material of the present invention which has been heat set is stable at a pH range equal to or below neutral point. On the other hand, the soybean protein which has not been heat set is stable at a non-limited pH range, suitably, at pH not higher than 9. As pH becomes lower, the hardness of the protein material is increased, which results in the firm mouthfeel.

In a case of a soybean protein material of the present invention which has been thawed among the protein materials which have not been heat set, pH can be arbitrarily selected when the protein material is eaten in a shorter period of time after thawing or is utilized for later heat-cooking. However, in other cases, the suitable pH range is normally around neutral to acidic.

This is because a non-heat set soybean protein material has such the properties that it dissolves in an aqueous alkaline medium when allowing to stand therein for a long period of time.

A soybean protein material of the present invention has the different physical properties depending upon whether it has been heat set or not. This difference is explained below.

First, a soybean protein material which has not been heat set is explained.

As used herein, the term "heat set" refers to the state where a soybean protein material is heat-denatured by heating to a extent that it does not dissolve in an aqueous medium at any pH range.

Examples of the soybean protein material which has not been heat set are a protein material having the structure in which ice is intervened between layers or fibers, or water is intervened therebetween, or gas is intervened therebetween, or none is intervened therebetween and the respective layers or fibers are brought into direct contact with each other.

A soybean protein material which has not been heat set is apparently seen gel-like as such or when water is intervened therebetween, but it has the smooth mouthfeel such that it melts in the mouth in spite of the layered or fibrous structure.

Then, a soybean protein material which has been heat set is explained.

A soybean protein material which has been heat set has the structure in which the layers or fibers are separated in a layered or fibrous fashion, showing the shape similar to flake-like or fibrous one.

In addition, a protein material obtained by applying the stress thereto with press or the like to exclude water present between the layers or fibers and thereby to hold the layers or fibers tight and thereafter heating it has the block-like structure and excellent meat-like mouthfeel.

Next, the material which has been heat set or not may be in the dried state. Examples of drying method are lyophilizing, heat frying, frying drying and the like. Drying method can be arbitrarily selected depending upon the use such as daily dish and convenience food, dispersion, storage and the like.

The following Examples and Comparative Examples further illustrate the present invention but are not to be construed to limit the scope thereof.

EXAMPLE 1

1 part by weight of defatted soybean was extracted with 12 parts by weight of water to give soybean milk. Hydrochloric acid was added to soybean milk to adjust pH to 4.5, to give an acid-precipitating soybean protein.

Then, water was added to the acid-precipitating protein to the protein concentration of 12% by weight. 1.56% of calcium hydroxide was added thereto and sodium hydroxide was added thereto to neutralize to pH 6.8.

Then, heating was carried out at 140° C. for 15 seconds. While the protein solution remained hot before cooling (at least 40° C.), 0.79% of calcium chloride was added thereto and the solution was stirred well to react with calcium.

The resulting protein solution was placed in a 400 milliliter stainless steel container. The container was placed in a small size environmental testing apparatus (manufactured by TABAI ESPECK K.K.). The protein solution was cooled to −20° C. at the cooling rate (the surface temperature falling rate) of −0.2° C./minutes to freeze. The ice crystals formation initiating temperature was −0.5° C. and the time for passing through maximum ice crystals forming zone was 2 hours and 10 minutes. This frozen protein material was thawed and found to have the extremely smooth mouthfeel like liquid. The protein material was observed to have the layered and gel-like texture. However, different from the gel containing water therein uniformly, the protein material had the structure in which a soybean protein was freeze-denatured and the soybean protein layers had grown via water.

Separately, this freeze-texturized material was thawed and pH was adjusted to 5.5 to 6.0 with lactic acid. As pH was adjusted to lower region, the mouthfeel became harder. Then, the material was centrifuged to dehydrate to the water content of 70%.

At this point, the protein material had the layered structure in which the plane-like layers had grown in the ununiform direction. The protein material was eaten and found to have the texture which was relatively soft and could be masticated.

Upon this, when dehydration was carried out more strongly, the protein material had the harder mouthfeel.

Then, the resulting dehydrated material was heat-treated at 80° C. for 30 minutes and cooled.

The resulting material was eaten and found to have the extremely similar mouthfeel to that of meat, different from the smooth mouthfeel as in the gel. The protein material was observed as follows: the layered texture remained unchanged but a soybean protein underwent both freeze-denaturation and heat-denaturation, which resulted in the harder and firmer texture. This is the reason why the material had the meat-like mouthfeel.

The photograph of the lyophilized soybean protein material (obtained by vacuum-drying a frozen material without thawing) obtained in Example 1 is shown in FIG. 1.

EXAMPLE 2

One part by weight of defatted soybean was extracted with 12 parts by weight of water to give soybean milk. Hydrochloric acid was added to the resulting soybean milk to adjust to pH 4.5, to give an acid-precipitating soybean protein. Crude protein per dried solid of this soybean protein was 92%.

Then, water was added to the acid-precipitating soybean protein to the protein concentration of 12% by weight. To this was added 1.56% of calcium hydroxide and sodium hydroxide was added to neutralize to pH 6.8. A soybean oil was added thereto at an amount of 50% based on the protein amount and the mixture was emulsified according to the conventional method, to give a solution of soybean protein emulsion.

Then, the solution was heated at 140° C. for 15 seconds. While the protein solution remained hot before cooling (at least 40° C.), 0.79% of calcium chloride was added thereto and the protein solution was stirred to react with calcium. The resulting protein solution was frozen as in Example 1. That is, the protein solution was cooled to −20° C. at the cooling rate (the surface temperature falling rate) of −0.2° C./minute to freeze.

Upon this, the ice crystals forming temperature in the central part was −0.5° C. The time for passing through maximum ice crystals forming zone during which the temperature passed −0.5° C. and further began to fall was 2 hours and 10 minutes.

The frozen material was thawed, eaten and found to have the extremely smooth mouthfeel like liquid. The material was carefully observed to have the layered gel-like texture. Different from the gel containing water therein uniformly, the material had the structure in which a soybean protein was freeze-denatured and the soybean protein layers had grown via water.

Separately, the freeze-texturized material was thawed and pH was adjusted to pH 5.5 to 6.0 with lactic acid. As pH was adjusted to a lower region, the mouthfeel became harder. Then, the material was centrifuged to dehydrate to the water content of 70%.

Upon this, as dehydration was carried out to a higher extent, the mouthfeel became harder.

Then, the dehydrated material was heat-treated at 80° C. for 30 minutes and cooled. The resulting material was eaten and found to have the extremely similar mouthfeel to that of meat, different from the smooth mouthfeel like the gel. The material was observed as follows: the layered texture remained unchanged but a soybean protein underwent both freeze-denaturation and heat-denaturation, which resulted in the harder and firmer texture. This is the reason why the material had the meat-like mouthfeel.

Separately, the above-described soybean protein material having the layered structure via water was lyophilized. Water was added to the lyophilized material to reconstitute to give a material, which had the similar properties to those of the material before lyophilizing.

EXAMPLE 3

A soybean protein material having the layered structure was obtained according to the same manner as that in Example 1 except that calcium hydroxide and sodium hydroxide were used in place of calcium hydroxide and calcium chloride.

1.96% of calcium hydroxide was added to an acid-precipitating protein having the protein concentration of 12% and thereafter sodium hydroxide was added to neutralize to pH 6.8, or 0.78% of calcium chloride was added thereto and sodium hydroxide was added to neutralize to pH 6.8.

Then, the material was heated at 140° C. for 15 seconds. After cooling, the material was cooled to −20° C. at the cooling rate (the surface temperature falling rate) of −0.2° C./minute to freeze as described in Example 1.

The resulting frozen material had the layered texture via water and had the extremely smooth mouthfeel like liquid in spite of solid.

Further, according to the same manner as in Example 1, pH adjustment, dehydration and heating were carried out to give a soybean protein texturized material having the meat-like mouthfeel.

EXAMPLE 4

A soybean protein material was obtained according to the same manner as that in Example 1 except that calcium hydroxide and calcium chloride were used in an amount of 0.2% by weight as calcium per crude protein of soybean protein.

The resulting protein material had the extremely soft mouthfeel. The material had the texture in which the layered structure was formed and the layers in the texture were loosened when gently stirred with a glass bar or the like.

Comparative Example 1

A comparative soybean protein material was obtained according to the same manner as that in Example 1 except that calcium hydroxide and calcium chloride were used in an amount of 0.005% by weight as calcium per crude protein of soybean protein.

Although the ice crystals were formed in a layered fashion by freezing, the material was found to be pasty, when thawed, without formation of the soybean protein texture.

EXAMPLE 5

A soybean protein material was obtained according to the same manner as that in Example 1 except that calcium hydroxide and calcium chloride were used in an amount of 3% by weight as calcium per crude protein of soybean protein.

The resulting soybean protein material was soft. However, the mouthfeel thereof was harder in comparison with that of protein material obtained according to the same manner as that in Example 1 to 3.

Comparative Example 2

A comparative soybean protein material was obtained according to the same manner as that in Example 1 except that calcium hydroxide and calcium chloride were used in an amount of 6% by weight as calcium per crude protein of soybean protein.

A soybean protein solution coagulated and lost the flowability before freezing. When the coagulated material was frozen, the sponge-like structure was formed but the layered structure was not obtained, which resulted in "kori-tofu"-like soybean protein material.

The resulting protein material had not smooth but "kori-tofu"-like mouthfeel.

EXAMPLE 6

A soybean protein solution before freezing was obtained according to the same manner as that in Example 1. Then, the solution was adjusted to pH 6.5 and frozen according to the same manner as that in Example, to give a soybean protein material.

A soybean protein solution in this Example had the lower viscosity in comparison with that of a soybean protein solution before freezing obtained according to the same manner as that in Example 1. The solution in this Example was frozen and thawed to give a soybean protein which was eaten and found to have the harder and stiffer mouthfeel in comparison with that of a soybean protein material obtained according to the same manner as that in Example 1. The protein material in this Example had the layered structure via water.

Further, the protein material of this Example was heated according to the same manner as that in Example 1. The resulting material had the harder and meat-like mouthfeel in comparison with that of a material obtained according to the same manner as that in Example 1.

Comparative Example 3

A comparison soybean protein material was obtained according to the same manner as that in Example 5 except that pH was adjusted to 4.5.

A soybean protein solution before freezing coagulated to give a "tofu"-like material which was frozen to obtain a sponge-like and "kori-tofu"-like texturized material. The resulting material had the harder mouthfeel than that of a material in Example 5, resulting in "kori-tofu"-like mouthfeel.

EXAMPLE 7

A soybean protein material was obtained according to the same manner as that Example 5 except that pH of a soybean protein solution upon freezing was adjusted to 8.0.

The resulting soybean protein material was extremely soft in comparison with a soybean protein material obtained according to the same manner as that Example 1. The protein material had the layered structure via water but its texture was easily loosened in a layered fashion when gently stirred with a glass bar or the like.

Separately, the resulting protein material was heated according to the same manner as that in Example 1. The heated material had the meat-like mouthfeel.

Comparative Example 4

A comparative soybean protein material was prepared according to the same manner as that in Example 6 except that pH was adjusted to 11.

The layered texture was formed by freezing. However, when thawed, the protein material lost the soybean protein texture and became pasty.

EXAMPLE 8

A soybean protein material was obtained according to the same manner as that in Example 1 and performing freezing except that pH of a soybean protein solution upon freezing was adjusted to 6.8.

The layered structure which was formed by freezing was not loosened even when allowed to stand at 20° C. or heated at 80° C.

EXAMPLE 9

A soybean protein material having the layered structure with needle ice crystals was obtained according to the same manner as that in Example 1 and performing freezing except that a soybean protein solution upon freezing was adjusted to pH 7.5.

After thawing, the protein material melted by allowing to stand at 20° C. or heating at 80° C. pH was re-adjusted to 6.8 after thawing. After pH re-adjustment, the soybean protein material was heated but it did not melt.

EXAMPLE 10

A soybean protein solution before freezing obtained according to the same manner as that in Example 1 was pre-treated by heating at 80° C. and thawed according to the same manner as that in Example 1, to obtain a soybean protein material which was thawed. The resulting protein material was extremely soft. Its texture was easily loosened by gently stirring with a glass bar or the like. However, the soybean protein material had the layered structure via water.

Comparative Example 5

A comparative soybean protein material was obtained according to the same manner as that in Example 10 except that a soybean protein solution before freezing obtained according to the same manner as that in Example 1 was pre-treated by heating at 55° C. for 15 seconds.

When the resulting soybean protein material was gently stirred with a glass bar or the like, it was converted into white due to insufficient partial texturization.

EXAMPLE 11

1250 milliliter of a soybean protein solution before freezing prepared according to the same manner as that in Example 1 was frozen at an ambient temperature of −10° C. according to the same manner as that in Example 1. Upon this, the cooling rate (the surface temperature falling rate) was 0.02° C. per minute.

At this point, the ice crystals forming temperature in the central part was −0.5° C. and the time for passing through maximum ice crystals forming zone during which the temperature passed this temperature region and began to further fall was 4 hours and 50 minutes.

The resulting soybean protein material had the texture in which the layered structure was formed via water and was extremely soft.

In addition, when a solution is frozen, the change in temperature is different between the surface and the central part, depending upon the volume and form thereof. Therefore, the change in temperature in the surface part was adopted as the change in cooling temperature. Furthermore, since the change in temperature at the surface part upon freezing was not linear, the cooling rate was obtained by linear approximation by connecting a point where cooling was initiated and that where the temperature reached an ambient one.

EXAMPLE 12

A solution of soybean protein emulsion obtained according to the same manner as that in Example 2 was heated at 140° C. for 15 seconds and 0.79% of calcium chloride was added thereto to react with calcium while stirring, to obtain a protein solution (referred to as "Ca protein solution" hereinafter).

Gluconodeltalactone (referred to as "GDL" hereinafter) was added thereto in an amount designated in Table 1 per crude protein of Ca protein solution and the mixture was cooled to −20° C. at the cooling rate (the surface temperature falling rate) of −0.2° C. and frozen. Upon this, the time for passing through maximum ice crystals forming zone was 2 hours and 10 minutes.

This frozen material was thawed, dehydrated with press (to the water content of 70%) and treated by heating at 80° C. for 30 minutes. pH and mouthfeel of a soybean protein food material after heating are also shown in Table 1.

TABLE 1

| GDL | pH | Mouthfeel |
|---|---|---|
| 1% | 6.6 | Soft and meat-like |
| 2% | 6.2 | Soft and meat-like |
| 2.5% | 5.9 | Slight resistance to the teeth |
| 3% | 5.7 | Slightly hard and meat-like |
| 5% | 5.1 | Hard and meat-like |
| 8% | 4.5 | Hard and meat-like |

As can be understood from Table 1, when GDL has been added thereto, pH adjusting step can be omitted thereafter and the mouthfeel can be pre-regulated.

EXAMPLE 13

Defatted soybean was extracted with water (15 times w/w) to obtain soybean milk. Hydrochloric acid was added to the soybean milk to adjust to pH 4.5, to obtain an acid-precipitating soybean protein. Crude protein was 92% per dried solid.

Then, the concentration of the acid-precipitating soybean protein was prepared to 12%. 1.56% of calcium hydroxide and 0.39% of calcium chloride were added to the acid-precipitating soybean protein, 0.8% of sodium chloride was further added and sodium hydroxide was added to adjust to pH 6.5. A soybean oil was added in an amount of 50% based on the weight of crude protein and the mixture was emulsified using a homomixer (manufactured by Tokushukikakogyo K.K.) under the conditions of 4000 rotation/sec to obtain a solution of soybean protein emulsion. Then, the solution was heated at 140° C. for 15 seconds and cooled to 5° C. To this solution was added 0.3% of gluconodeltalactone to obtain a soybean protein emulsion preparation.

1800 cc of this soybean protein emulsion preparation was placed in a stainless steel container (70 mm in length, 112 mm in width and 105 mm in height) in which bottom and two sides thereof were thermally insulated with the expanded polystyrene and was frozen at −30° C. in an air-cooling type refrigerator.

The temperature in the central part was measured in the freezing step to obtain the time for passing through maximum ice crystals forming zone of 6 hours. A soybean protein texturized material obtained by freezing had the layered texture via the traces of ice crystals which had grown in a plane-like fashion. When carefully peeled, the layers were peeled in a layered fashion although a part of layers were bound slightly to each other. The protein material was eaten and found to have the excellent masticating properties.

EXAMPLE 14

One part by weight of defatted soybean was extracted with 12 parts by weight of water to obtain soybean milk. Hydrochloric acid was added to the soybean milk to adjust to pH 4.5, to obtain an acid-precipitating soybean protein. Crude protein per dried solid of the soybean protein was 92%.

Then, the concentration of the acid-precipitating soybean protein was prepared to 12%, 1.56% of calcium hydroxide and 0.39% of calcium chloride were added thereto, 0.8% of sodium chloride was further added thereto and sodium hydroxide was added to neutralize to pH 6.5. A soybean oil was added thereto in an amount of 50% based on the weight of protein and the mixture was emulsified at 4000 rotation/sec using a homomixer (manufactured by Tokushukikakogyo K.K.) to obtain a solution of soybean protein emulsion.

Then, the solution was heated at 140° C. for 15 seconds and cooled to 5° C. To this solution was added 0.3% of gluconodeltalactone to obtain a soybean protein preparation.

1800 cc of this preparation was placed in a stainless steel container (70 mm in length, 112 mm in width and 105 mm in height) in which the bottom and two sides thereof were thermally insulated with the expanded polystyrene and was frozen at −23° C. in a cooling brine containing calcium chloride.

The temperature in the central part was measured in the freezing step to obtain the time for passing through maximum ice crystals forming zone of 55 minutes.

Further, this frozen material was thawed and warmed with warm water so that the temperature in the central part became 40° C.

Then, this texturized material was taken out from the container and dehydrated with press (to the water content of 70%) in the direction parallel to the fibers.

The resulting texturized material was packaged sealingly under vacuum, heated with warm water so that the temperature in the central part became 80° C. and cooled thereafter.

Figure 2:
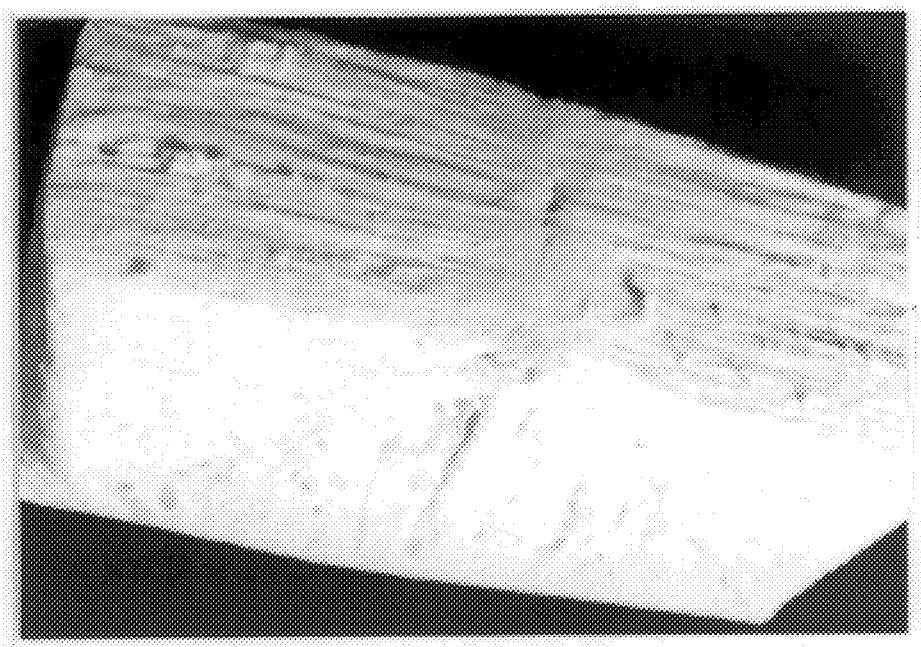
FIG. 2 is a photograph of a blocky and massy soybean protein material obtained in Example 14.

The cross section of the resulting soybean protein texturized material was observed to be layered as shown in FIG. 2 (The cross section is seen in the upper part of the photograph). The protein material was the blocky mass in which the fine fibers were oriented in one direction and bound together. The blocky mass had the meat-like texture which was loosened into the fibers in only one direction when torn as shown in FIG. 3. The soybean protein texturized material had the good mouthfeel.

What is claimed is:

1. A process for production of a soybean protein material having a layered structure comprising:

heating a solution of soybean protein containing 0.2 to 1.0% by weight of an alkaline earth metal based on the weight of crude protein contained in the soybean protein at a temperature not lower than 60° C. for longer than one second, provided that such heating at a temperature above 100° C. occurs for no longer than 1 minute, said solution having a concentration of 0.1 to 35% by weight based on the total weight of the solution, to obtain a heat-treated solution; and freezing the heat-treated solution at a pH of 5 to 9 at a rate such that the solution passes through a maximum ice crystals forming zone in not less than 30 minutes;

to thereby obtain a frozen soybean protein material having the layered structure.

2. The process according to claim 1 further comprising thawing the frozen soybean protein material.

3. The process according to claim 2 further comprising heating the thawed soybean protein material.

4. The process according to claim 2, further comprising dehydrating the thawed soybean protein material.

5. The process according to claim 4, further comprising heating the dehydrated soybean protein material.

6. The process according to claim 3 or 5 further comprising drying the heated soybean protein material.

7. The process according to claim 1, wherein the solution of soybean protein is heated at a temperature of 80° to 160° C. for not shorter than 5 seconds.

* * * * *